(12) United States Patent
Katoh

(10) Patent No.: US 7,560,154 B2
(45) Date of Patent: Jul. 14, 2009

(54) METHOD FOR MANUFACTURING HONEYCOMB STRUCTURE AND THE HONEYCOMB STRUCTURE

(75) Inventor: Shigeki Katoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 439 days.

(21) Appl. No.: 11/369,958

(22) Filed: Mar. 8, 2006

(65) Prior Publication Data
US 2006/0217256 A1 Sep. 28, 2006

(30) Foreign Application Priority Data
Mar. 24, 2005 (JP) ............... 2005-085267
Jan. 24, 2006 (JP) ............... 2006-014749

(51) Int. Cl.
*B32B 3/12* (2006.01)
*C04B 35/00* (2006.01)

(52) U.S. Cl. ............ 428/116; 502/527.19; 501/1

(58) Field of Classification Search ........... 428/116, 428/117; 501/1; 502/527.19
See application file for complete search history.

(56) References Cited

U.S. PATENT DOCUMENTS 5,319,861 A * 6/1994 Tate ..................... 34/267

FOREIGN PATENT DOCUMENTS

| | | | |
|---|---|---|---|
| EP | 0 449 556 A2 | | 10/1991 |
| EP | 0 554 104 A2 | | 8/1993 |
| EP | 0 884 459 A2 | | 12/1998 |
| EP | 1 364 928 A1 | | 11/2003 |
| EP | 1 484 100 A1 | | 12/2004 |
| EP | 1 586 547 A1 | | 10/2005 |
| EP | 1 702 909 A1 | | 9/2006 |
| JP | B2-2613729 | | 2/1997 |
| JP | 2000095570 | * | 4/2000 |
| JP | A 2004-075524 | | 3/2004 |
| JP | 2004231506 | * | 8/2004 |
| WO | WO2004/042205 | * | 5/2004 |
| WO | WO 2004/063125 A1 | | 7/2004 |

* cited by examiner

*Primary Examiner*—Timothy C Vanoy
*Assistant Examiner*—Daniel Berns
(74) *Attorney, Agent, or Firm*—Oliff & Berridge, PLC

(57) ABSTRACT

A method for manufacturing a honeycomb structure includes: machining a peripheral portion of a honeycomb substrate having a plurality of cells separated by porous partition walls made of ceramic, applying slurry for forming a coating member on a face exposed to outer periphery of partition walls positioned in the outermost periphery to obtain a honeycomb body with slurry, and subjecting the honeycomb body with slurry to heat-drying to obtain a honeycomb structure having the coat member in the outer periphery. The slurry contains a powder of potsherd having a particle size of 15 to 75 μm, and has a water content of 26 to 34% by mass. In the method, even if the slurry is subjected to compulsory drying from the beginning, the coating member hardly has cracks, and a honeycomb structure having no cracks on the coating member can be obtained.

2 Claims, 3 Drawing Sheets

METHOD FOR MANUFACTURING HONEYCOMB STRUCTURE AND THE HONEYCOMB STRUCTURE

BACKGROUND OF THE INVENTION AND RELATED ART STATEMENT

The present invention relates to a honeycomb structure used as a filter, a catalyst carrier, or the like and a manufacturing method thereof.

A honeycomb structure is widely used as a filter, a catalyst carrier, or the like, and in particular, as a catalyst carrier, a filter, or the like, for purifying or treating exhaust gas from an internal combustion engine such as a gasoline engine or a diesel engine or a combustion apparatus.

As one of the methods for manufacturing a honeycomb structure used for such a purpose, there has been known a method for manufacturing a honeycomb structure having a coating member covering the outer periphery thereof by machining a peripheral portion of a honeycomb substrate having a plurality of-cells separated by ceramic porous partition walls to give a predetermined shape, applying slurry for forming a coating member on a face exposed to the outer periphery of the partition walls positioned in the outermost periphery, and drying the slurry.

A honeycomb shaped substrate as described above can generally be obtained by drying and/or firing a honeycomb-shaped formed body obtained by extrusion forming using clay made of predetermined raw materials. Since deformation is prone to be caused in the drying and firing steps, in the case of using the honeycomb substrate for a honeycomb structure requiring high shape precision to some degree, the peripheral portion is machined into a predetermined shape by grinding, or the like after drying or firing, and a surface of the partition walls exposed in the outer periphery by the machining is covered with a coating member, thereby manufacturing a honeycomb structure satisfying the required shape precision.

Such a honeycomb structure having a coating member covering the outer periphery has conventionally been manufactured by preparing slurry for forming a coating member containing an aggregate particle of a powder of potsherd or the like as the main component, applying the slurry on a face exposed to the outer periphery of the partition walls positioned in the outermost periphery of the honeycomb substrate subjected to machining to give a predetermined shape, leaving the honeycomb substrate with slurry in room temperature in the ambient air for natural drying, and subjecting the honeycomb to heat-drying as necessary (e.g., Japanese Patent No. 2613729).

The slurry for forming a coating member is not subjected to compulsory drying such as heat-drying from the beginning but dried naturally to some extent in the above conventional manufacture method because cracks are easily caused in the coating member if the slurry is dried and shrinks suddenly by compulsory drying from the beginning.

However, when the slurry for forming a coating member applied in such a manner is naturally dried, it requires long drying time and, and thereby time for manufacturing a honeycomb structure is increased as a whole. In the case of mass production, a large space for storing a large number of honeycomb structures is required upon drying.

SUMMARY OF THE INVENTION

The present invention has been made in view of such conventional circumstances and aims to provide a manufacture method which hardly cause cracks even if the slurry for forming a coating member is subjected to compulsory drying from the beginning in manufacturing a honeycomb structure having a coating member in the outer periphery thereof, and a honeycomb structure with no crack in the coating member obtained in this method.

According to the present invention, there is provided a method for manufacturing a honeycomb structure comprising the steps of:

machining a peripheral portion of a honeycomb substrate having a plurality of cells separated by porous partition walls made of ceramic, applying slurry for forming a coating member on a face exposed to outer periphery of partition walls positioned in the outermost periphery to obtain a honeycomb body with slurry, and subjecting the honeycomb body with slurry to heat-drying to obtain a honeycomb structure having the coat member in the outer periphery thereof;

wherein the slurry for forming a coat member contains a powder of potsherd having a particle size of 15 to 75 μm, and the slurry has a water content of 26 to 34% by mass.

According to the present invention, there is also provided a honeycomb structure manufactured by machining a peripheral portion of a honeycomb substrate having a plurality of cells separated by porous partition walls made of ceramic, and covering a face exposed to outer periphery of partition walls positioned in the outermost periphery with a coating member;

wherein a ratio of porosity A of the face covered with the coating member of the partition walls positioned in the outermost periphery and porosity B of a face exposed to the inside of the cells of the partition walls (A/B×100 (%)) is 97 to 50%.

According to a manufacture method of the present invention, even if the slurry for forming a coating member is subjected to compulsory drying such as far-infrared ray drying and hot-air drying, the coating member hardly has cracks. By drying the slurry for forming a coating member for a short time with such compulsory drying, time for manufacturing a honeycomb structure is reduced. A space required for drying such honeycomb structures can also be reduced in comparison with the case of natural drying. In addition, a honeycomb structure of the present invention has good adhesion between partition walls and the coating member on the partition walls, and as a result, almost no crack, which generates in a drying step for slurry for forming a coating member, is present in the coating member.

DETAILED DESCRIPTION OF THE INVENTION

Figure 1:
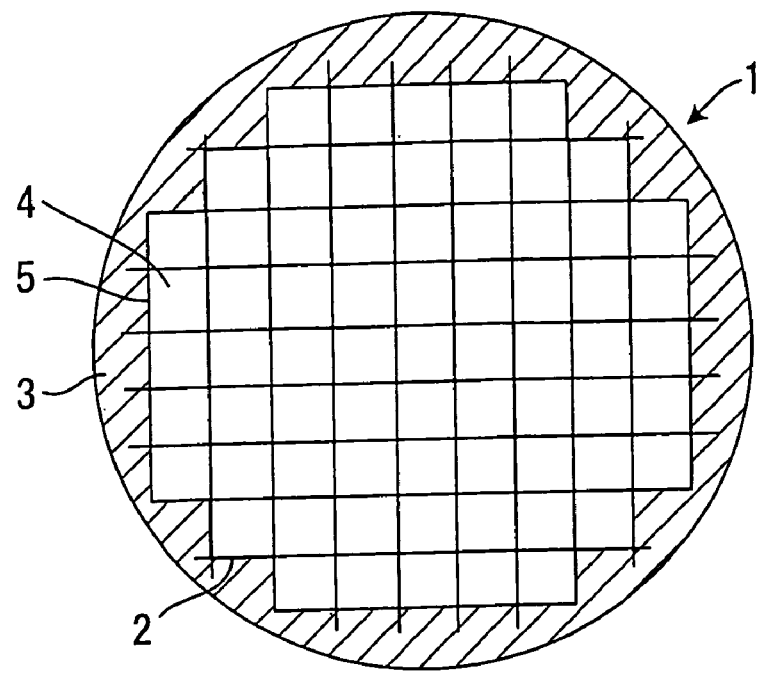
FIG. 1 is a schematic sectional view showing a honeycomb structure having a coating member in the outer periphery thereof.
Figure 2:
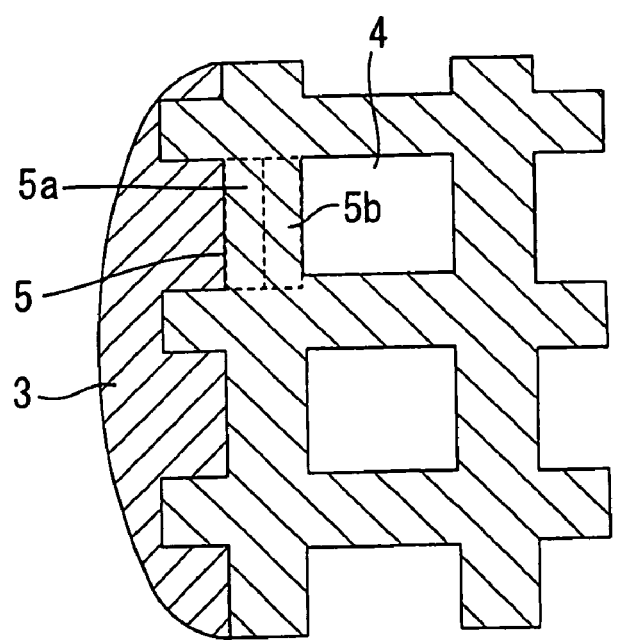
FIG. 2 is a partially enlarged view of FIG. 1.

A method for manufacturing a honeycomb structure of the present invention is a method manufacturing a honeycomb structure 1 having a coating member 3 in the outer periphery as shown in FIG. 1 and FIG. 2, which shows a partially enlarged view of FIG. 1 by machining a peripheral portion of a honeycomb substrate having a plurality of cells separated by porous partition walls made of ceramic, applying slurry for forming a coating member on a face exposed to outer periphery of partition walls positioned in the outermost periphery (a face constituting the outer peripheral face of the honeycomb substrate), and drying the slurry. As its characteristic constitution, the slurry for forming a coat member contains a powder of potsherd having a particle size of 15 to 75 μm, and the slurry has a water content of 26 to 34% by mass.

The present inventors manufactured honeycomb structures each having a coating member in the outer periphery thereof in various conditions and made investigation into ones having cracks caused in the coating member in the step of heat-drying the slurry for forming a coating member and ones having almost or completely no crack. As a result, as a whole tendency, ones having cracks had bad adhesion between partition walls and coating members, and gaps were found between partition walls and coating members by observation with a microscope after drying. In contrast, ones having almost or completely no crack had good adhesion between partition walls and coating members, and almost no gap was found between partition walls and coating members by observation with a microscope after drying, and a boundary between them could hardly be found.

The reason why cracks are hardly caused when adhesion between partition walls and coating members is good seems that shrinkage is very little because water contained in slurry for forming a coating member quickly diffuses in the partition walls after the slurry is applied on the porous partition walls, and it is dried in a condition that water in the coating member has already reduced fairly even in the case of compulsory drying.

The present invention could be obtained as a result of the present inventors' research to obtain a coating member having good adhesion with partition wall on the basis of the above knowledge. To improve adhesion between partition walls and a coating member, it is important to enhance flowability of the slurry for forming a coating member (to decrease viscosity). As a method for enhancing flowability, there is a method in which a water content of the slurry for forming a coating member is raised. However, if the water content is too high, viscosity is too low for the slurry to stay in the position where the slurry is applied, and the slurry drops. Therefore, in the present invention, the water content of the slurry for forming a coating member is set to 25 to 34% by mass, preferably 28 to 32% by mass, more preferably 30 to 32% by mass. By such a water content, good adhesion can be obtained by high flowability, and the slurry hardly drops with good appliability.

In the present invention, the main component of the slurry for forming a coating member is a powder of potsherd. I found out that a particle size of the powder of potsherd has a close relation with possibility of causing cracks. Specifically, it has been confirmed that the coarser the powder of potsherd is, the less the cracks generate. This is considered because a dry-shrinkage amount of the coating member decreases when the powder of potsherd is coarse. However, a too large particle size makes a surface too coarse when the slurry is applied on the surface, and defects such as damages is prone to be caused. Therefore, in the present invention, the particle size of a powder of potsherd contained in the slurry for forming a coating member is set to 15 to 75 μm, preferably 30 to 60 μm, more preferably 45 to 60 μm. By such a particle size can give good surface conditions to the coating member with inhibiting cracks from generating.

Incidentally, a particle size of a powder of potsherd in the present invention is a value measured by a laser diffraction scattering method. As a device for the measurement, LA-910 produced by Horiba, Ltd. Conditions of the measurement were 50 times of sampling, 10 of waiting time after dispersion, 5 of stirring speed, 5 of circulation speed, and 0.12 g of sample weight.

When the powder of potsherd is pulverized to give particles, there can suitably be used a pin mill, a roller mill, a ball mill, a jet mill or the like as a pulverizer.

There is no particular limitation on a method for applying slurry for forming a coating member. For example, when the slurry is applied on the honeycomb substrate having a cylindrical outer shape, the slurry can be applied to be flat and smooth on the outer periphery with rotating the honeycomb substrate by attaching the honeycomb substrate to a revolving jig in such a manner that the honeycomb substrate can rotate around the central axis.

As a method for heat-drying the slurry for forming a coating member applied on the honeycomb substrate, a method such as far-infrared ray drying or hot-air drying is preferably used, and far-infrared ray drying is particularly desirable because heat-drying can be performed with no wind. The far-infrared ray drying can be performed using a far-infrared ray drier on the market. For example, when far-infrared ray drying is performed with setting an atmospheric temperature at about 80° C., drying of slurry for forming a coating member, which takes a whole day and night by natural drying, can be performed for only about one hour. In addition, far-infrared ray drying has a wider application range of a particle size of the coating member in comparison with hot-air drying, and is particularly excellent in applicability to a coating member having minute particles, which can be expected to give high strength, which is an important characteristic for a honeycomb structure. However, since far-infrared ray drying tends to have lowered drying ability in accordance with the enlargement of outer diameter of the honeycomb structure, in the case of manufacturing a large-sized honeycomb structure using a coating member containing minute particles, a combination of far-infrared ray drying and following hot-air drying is effective. Thus, by employing a combination of far-infrared ray drying and hot-air drying, a honeycomb structure with high quality can be obtained at a low cost.

Next, a honeycomb structure of the present invention will be described. A honeycomb structure of the present invention is manufactured by machining a peripheral portion of a honeycomb substrate having a plurality of cells separated by porous partition walls made of ceramic and covering a face exposed to outer periphery of partition walls positioned in the outermost periphery (face constituting the outermost peripheral face of the honeycomb substrate) with a coating member, and a ratio of porosity A of the face covered with the coating member of the partition walls positioned in the outermost periphery and porosity B of a face exposed to the inside of the cells of the partition walls (A/B×100(%)) is 90 to 50%, preferably 95 to 70%.

Figure 3:
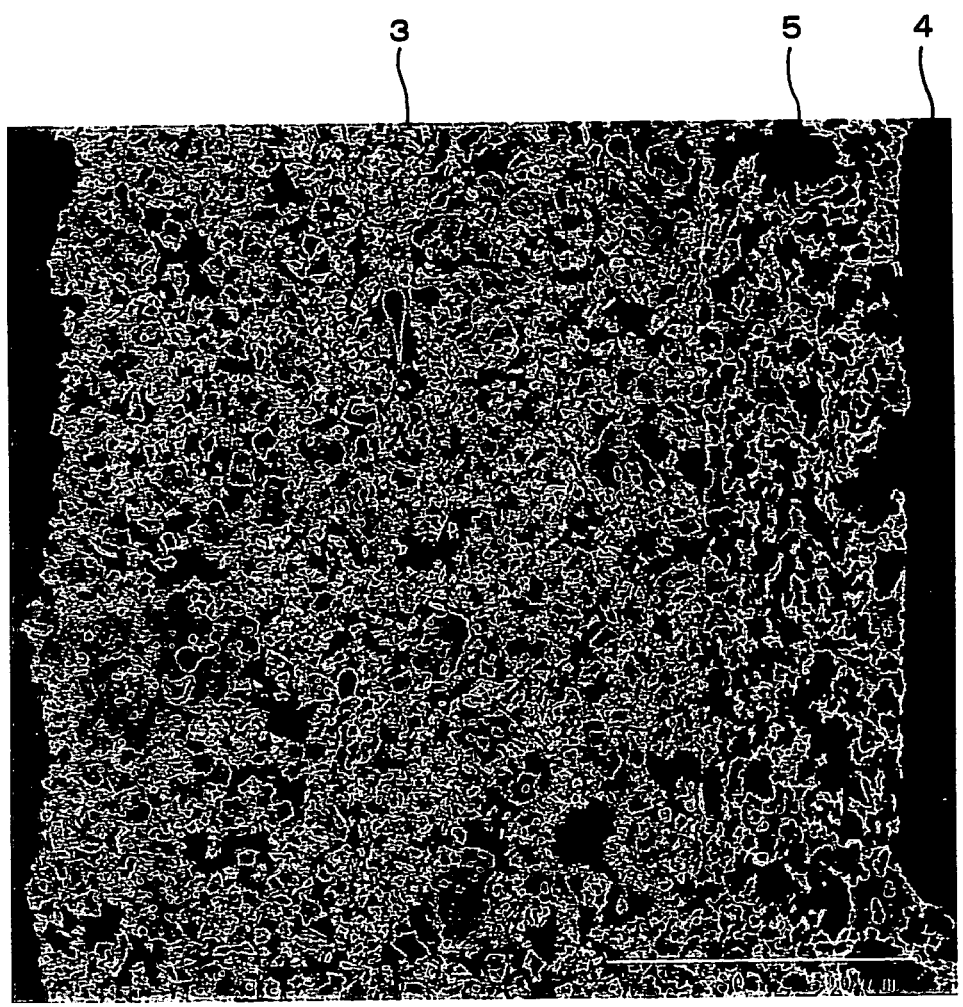
FIG. 3 is a photograph of a sectional minute structure of a honeycomb structure having a coating member in the outer periphery thereof taken by a scanning electronic microscope (SEM).
Figure 4:
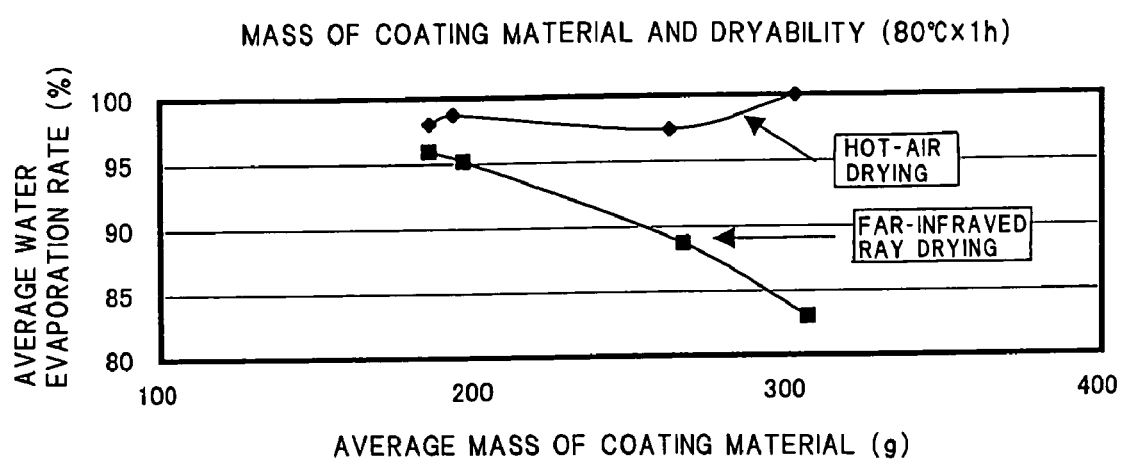
FIG. 4 is a graph showing a correlation of mass of a coating material and dryability.

As described above, it was found that one with cracks being hardly caused during drying the coating member (slurry for forming a coating member) has good adhesion between partition walls and the coating member. Good adhesion is in the condition that a part of solid components such as a powder of potsherd constituting the coating member 3 enters into pores of the porous partition walls 5 as shown in a photograph of a sectional structure of a honeycomb structure taken by a scanning electronic microscope (SEM) of FIG. 3. As a result, porosity of partition walls in a face covered with the coating member 3 is considerably lowered with respect to porosity of partition walls of the uncovered face (face exposing to inside the cells 4).

The investigation was made repeatedly with paying attention to the porosity of the partition walls, and it was found that, when the ratio of porosity A of the face covered with the coating member of the partition walls positioned in the outermost periphery and porosity B of a face exposed to the inside of the cells of the partition walls (A/B×100(%)) is 97 to 50%, preferably 95 to 70%, good adhesion can be obtained between partition walls and the coating member, and that almost no cracks are generated upon drying the coating member. When the ratio is above 97%, adhesion between partition walls and the coating member is so sufficient that cracks may generate during drying the coating member and that isostatic rupture strength is deteriorated. When the ratio is below 50%, thermal shock performance is deteriorated because of a difference in thermal expansion between the honeycomb substrate and the coating material.

Incidentally, the porosities A and B can be obtained by measuring by image analysis of each of the portions 5a and 5b obtained by separating the micrograph of a section of the partition wall 5 which is positioned in the outermost periphery of the honeycomb substrate 2, covered with a coating member 3 on one face, and exposed to inside the cell 4 on the other face so that the portions 5a and 5b has the same thickness. Porosity in the portion 5a is porosity A, and porosity in the portion 5b is porosity B. For the measurement of porosities by image analysis, an Image-Pro PLUS Version 5.0 J (produced by U.S. Media Cybernetics) was used as an image analysis software. When binary processing for selecting the material portion and the pore portion was performed, a micrograph subjected to photographing of microstructure was used so as to easily distinguish the material portion from the pore portion. When a value of a gray scale was set, it was confirmed that the material portion and the pore portion in the substrate is accurately selected with comparing the binary image to the original photograph. The one pixel size upon obtaining a digital image of the photograph was a size (for example, about 3 μm), which is sufficiently small for expressing the system of the material.

A honeycomb structure having the above porosity can be manufactured by a manufacture method of the present invention described above. The porosity B is generally a porosity the substrate originally has. Therefore the rate of the porosities (A/B×100(%)) can be adjusted by changing the porosity A. As the viscosity of the slurry is lowered by, for example, increasing the water content of the slurry for forming a coating member, the porosity A is lowered, and the ratio of the porosities is lowered.

In the present invention, a honeycomb substrate can be obtained by drying and/or firing a honeycomb formed body obtained by subjecting clay made of a predetermined material to extrusion forming. There is no particular limitation on material of the honeycomb substrate. In the case that the honeycomb structure is used as a diesel particulate filter (DPF) or a large-sized honeycomb structure, a material such as silicon carbide, cordierite, or the like, is suitable. There is no particular limitation on an outer shape, dimensions, a cell shape, a cell density, or a partition wall thickness, and they may suitably be selected according to the use and the environment of use. Though grinding is general as a method for machining the outer peripheral portion of the honeycomb substrate in a predetermined shape, another method may be employed.

EXAMPLES

The present invention is hereinbelow described in more detail on the basis of Examples. However, the present invention is by no means limited to these Examples.

Powders of potsherd each having a particle size of 15 μm, 30 μm, 45 μm, 60 μm, 75 μm, or 90 μm were prepared. To 60% by mass of each of the powders were added water, an adequate amount of colloidal silica, aluminosilicate fiber, talc, polymeric polysaccharide, and antiseptic to manufacture slurry for forming a coating member having a water content of 24% by mass, 26% by mass, 28% by mass, 30% by mass, 32% by mass, 34% by mass, or 36% by mass (42 kinds of slurry in combination of the above particle sizes of powders of potsherd and the above water contents).

The above slurry was applied in the outer periphery (face exposed to the outer periphery of the partition walls positioned in the outermost periphery) of the cordierite-based honeycomb substrate whose outer peripheral portion was subjected to grinding after firing (cylindrical shape of 229 mm in diameter×254 mm in length, square cell shape, cell density of 260 cells/inch$^2$ (about 40.3 cells/cm$^2$), partition wall thickness of 12 mil (about 300 μm) with an end faces of adjacent cells being alternately plugged so that each end face has a checkerwise pattern on the assumption that it is used as a DPF), The slurry was applied so that the layer of the slurry might have a thickness of 0.75 mm by attaching the honeycomb substrate to a revolving jig in such a manner that the honeycomb substrate can rotate around the central axis.

After applying the slurry for forming a coating member, the slurry was dried in three kinds of methods, i.e., natural drying (about 24 hours at room temperature), far-infrared ray drying (about one hour at an atmospheric temperature of about 80° C.), and hot-air drying (about one hour at a hot-air temperature of about 80° C. with a wind velocity of 1 m/s) to obtain a honeycomb structure having a coating member covering the outer periphery thereof.

Such application and drying was performed using each of the 42 kinds of slurry for forming a coating member, and evaluations were made using the following criteria on slurry dripping, dryability after being dried in each drying method, and surface roughness of the coating member after drying, and the results are shown in Table 1 to 5. In addition, the honeycomb structures obtained by using slurry for forming a coating member having a particle size of powder of potsherd of 45 μm and a water content of 24% by mass, 26% by mass, 28% by mass, 30% by mass, 32% by mass, 34% by mass, and 36% by mass were measured for the above porosity A, and ratios (A/B×100(%)) of porosity A to porosity B (original porosity 60.1% of the honeycomb substrate) were obtained. The results are shown in Tables 6 and 7. Further, the honeycomb structures obtained by using the above slurry for forming a coating member were measured for isostatic rupture strength and thermal shock resistance, and the results are shown in Tables 8 and 9.

(Slurry dripping)

Honeycomb structures having no dripping (dripping of the applied slurry for forming a coating member) were evaluated as "Good", honeycomb structures having some dripping which can be mended were evaluated as "Fair", and honeycomb structures having dripping and a reduced outer diameter size were evaluated as "Bad".

(Dryability of Natural Drying) (Dryability of Far-infrared Ray Drying) (Dryability of Hot-Air Drying)

The coating member was observed after drying, and honeycomb structures having no or a few hair cracks (shallow and fine cracks on a surface of the coating member) on the coating member were evaluated as "Good", honeycomb structures having tens of hair cracks on the coating member were evaluated as "Fair", and honeycomb structures having cracks penetrating the coating member were evaluated as "Bad".

(Surface roughness of coating member)

The coating members were observed after drying, and honeycomb structures having coating members with flat and smooth surfaces were evaluated as "Good", honeycomb structures having coating members with some unevenness but no damage or the like were evaluated as "Fair", and honeycomb structures having coating members with some unevenness and damages or the like were evaluated as "Bad".

(Isostatic rupture strength)

Honeycomb structures were covered with amber factice, and isotropic pressure is applied to measure for rupture pressure, which was employed as isostatic rupture strength.

(Thermal shock resistance)

Honeycomb structures were put in an electric furnace having a predetermined temperature and heated for 30 minutes. Then, they were taken out and left at room temperature. After the honeycomb structure was cooled in this manner, surfaces of the coating members were observed and checked if there was any crack which penetrated the coating members. Such tests were repeated with gradually raising heating temperature in the furnace, and Evaluations were given on the heating temperature when generation of a crack was observed.

TABLE 1

Slurry dripping

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | Good | Good | Good | Good | Good | Fair | Bad |
| | 30 | Good | Good | Good | Good | Good | Fair | Bad |
| | 45 | Good | Good | Good | Good | Good | Fair | Bad |
| | 60 | Good | Good | Good | Good | Good | Fair | Bad |
| | 75 | Good | Good | Good | Good | Good | Fair | Bad |
| | 90 | Good | Good | Good | Good | Good | Fair | Bad |

TABLE 2

Dryability of natural drying

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | Bad | Fair | Good | Good | Good | Fair | Bad |
| | 30 | Fair | Good | Good | Good | Good | Good | Fair |
| | 45 | Good | Good | Good | Good | Good | Good | Good |
| | 60 | Good | Good | Good | Good | Good | Good | Good |
| | 75 | Good | Good | Good | Good | Good | Good | Good |
| | 90 | Good | Good | Good | Good | Good | Good | Good |

TABLE 3

Dryability of far-infrared ray drying

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | Bad | Bad | Fair | Good | Good | Fair | Bad |
| | 30 | Bad | Fair | Good | Good | Good | Fair | Bad |
| | 45 | Fair | Good | Good | Good | Good | Fair | Bad |
| | 60 | Fair | Good | Good | Good | Good | Good | Bad |
| | 75 | Fair | Good | Good | Good | Good | Good | Bad |
| | 90 | Fair | Good | Good | Good | Good | Good | Bad |

TABLE 4

Dryability of hot-air drying

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | Bad | Bad | Bad | Bad | Bad | Bad | Bad |
| | 30 | Bad | Bad | Fair | Good | Good | Fair | Bad |
| | 45 | Bad | Fair | Good | Good | Good | Fair | Bad |
| | 60 | Bad | Fair | Good | Good | Good | Fair | Bad |
| | 75 | Bad | Fair | Good | Good | Good | Fair | Bad |
| | 90 | Bad | Fair | Good | Good | Good | Fair | Bad |

TABLE 5

Surface roughness of coating member

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | Bad | Fair | Good | Good | Good | Good | Good |
| | 30 | Bad | Fair | Good | Good | Good | Good | Good |
| | 45 | Bad | Fair | Good | Good | Good | Good | Good |
| | 60 | Bad | Fair | Good | Good | Good | Good | Good |
| | 75 | Bad | Bad | Fair | Good | Good | Good | Fair |
| | 90 | Bad | Bad | Bad | Bad | Bad | Bad | Bad |

TABLE 6

Porosity A (%)

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd ($\mu m$) | 15 | — | — | — | — | — | — | — |
| | 30 | — | — | — | — | — | — | — |
| | 45 | 60.5 | 58.5 | 57.0 | 50.2 | 42.2 | 30.3 | 27.2 |
| | 60 | — | — | — | — | — | — | — |
| | 75 | — | — | — | — | — | — | — |

TABLE 7

Porosity ratio (A/B × 100(%))

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd (μm) | 15 | — | — | — | — | — | — | — |
| | 30 | — | — | — | — | — | — | — |
| | 45 | 101 | 97 | 95 | 94 | 70 | 50 | 45 |
| | 60 | — | — | — | — | — | — | — |
| | 75 | — | — | — | — | — | — | — |

TABLE 8

Isostatic rupture strength (MPa)

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd (μm) | 15 | — | — | — | — | — | — | — |
| | 30 | — | — | — | — | — | — | — |
| | 45 | 1.2 | 1.5 | >1.5 | >1.5 | >1.5 | >1.5 | >1.5 |
| | 60 | — | — | — | — | — | — | — |
| | 75 | — | — | — | — | — | — | — |
| | 90 | — | — | — | — | — | — | — |

TABLE 9

Thermal shock resistance (° C.)

| | | Water content of slurry for forming a coating member (mass %) | | | | | | |
|---|---|---|---|---|---|---|---|---|
| | | 24 | 26 | 28 | 30 | 32 | 34 | 36 |
| Particle size of powder of potsherd (μm) | 15 | — | — | — | — | — | — | — |
| | 30 | — | — | — | — | — | — | — |
| | 45 | >600 | >600 | >600 | >600 | >600 | 600 | 550 |
| | 60 | — | — | — | — | — | — | — |
| | 75 | — | — | — | — | — | — | — |
| | 90 | — | — | — | — | — | — | — |

As the above Tables show, in the case of using slurry for forming a coating member having a water content of 26 to 34% by mass, dripping of slurry upon application was seldom caused, and almost no cracks are generated upon drying in any of the drying methods to show good dryability. In addition, surface roughness of the coat members was generally good. These evaluations were excellent in the case of using slurry for forming a coating member containing powders of potsherd having a particle size of 30 to 60 μm with a water content of 28 to 32% by mass, and generation of even hair cracks was not observed in the case of slurry for forming a coating member containing powders of potsherd having a particle size of 45 to 60 μm with a water content of 30 to 32% by mass. Further, honeycomb structures having a porosity ratio (A/B×100(%)) of 97 to 50% had high isostatic rupture strength and high thermal shock resistance because adhesion between partition walls and a coating member was high, and Evaluations on dryability and the like in manufacturing the honeycomb structures were good.

Thus, the present invention can suitably be used as a honeycomb structure used as a filter, a catalyst carrier, or the like, and as a manufacture method thereof.

What is claimed is:

1. A method for manufacturing a honeycomb structure comprising the steps of:
   machining a peripheral portion of a honeycomb substrate having a plurality of cells separated by porous partition walls made of ceramic,
   applying slurry for forming a coating member on a face exposed to outer periphery of partition walls positioned in the outermost periphery to obtain a honeycomb body with slurry, and
   subjecting the honeycomb body with slurry to heat-drying to obtain a honeycomb structure having the coat member in the outer periphery thereof;
   wherein the slurry for forming a coat member contains a powder of potsherd having a particle size of 15 to 75 μm, and the slurry has a water content of 26 to 34% by mass,
   wherein the heat-drying is performed by any one of hot-air drying, far-infrared ray drying, and a combination of far-infrared ray drying and hot-air drying.

2. A honeycomb structure manufactured by machining a peripheral portion of a honeycomb substrate having a plurality of cells separated by porous partition walls made of ceramic, and covering a surface of the partition walls exposed to outer periphery of partition walls positioned in the outermost periphery with a coating member;
   wherein a ratio of porosity A of a cross sectional portion of the partition walls covered with the coating member of the partition walls positioned in the outermost periphery and porosity B of a cross sectional portion of the partition walls exposed to the inside of the cells of the partition walls (A/B×100(%)) is 97 to 50%.

* * * * *